UNITED STATES PATENT OFFICE.

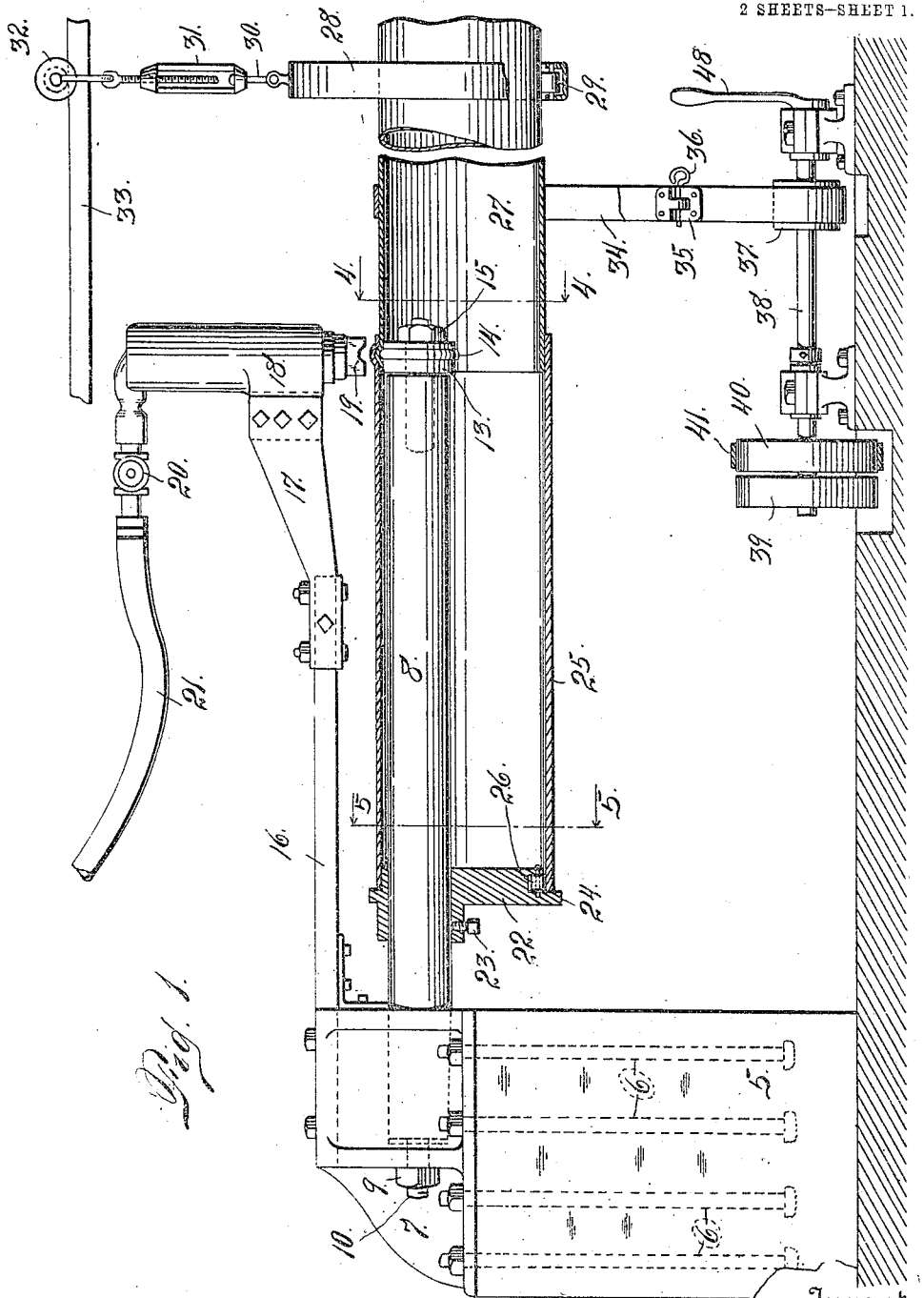

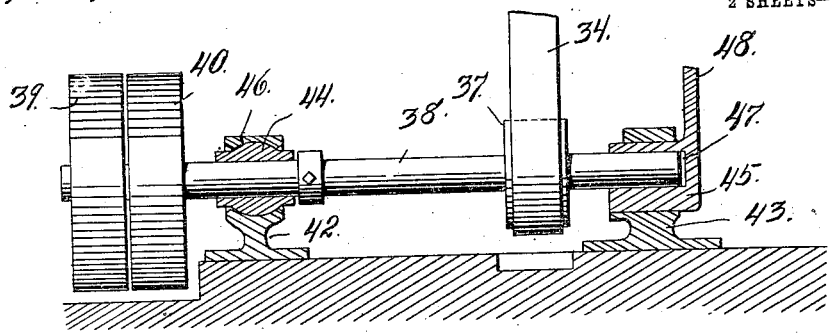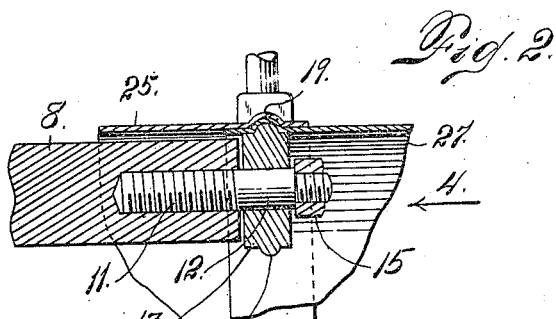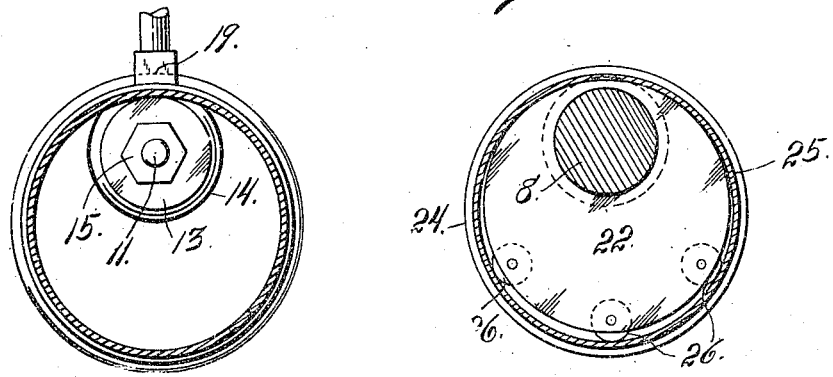

ERNEST HUMPHREY, OF DENVER, COLORADO.

PIPE-COUPLING MACHINE.

1,086,178.   Specification of Letters Patent.   Patented Feb. 3, 1914.

Application filed January 6, 1913. Serial No. 740,291.

*To all whom it may concern:*

Be it known that I, ERNEST HUMPHREY, a citizen of the United States, residing in the city and county of Denver and State of Colorado, have invented certain new and useful Improvements in Pipe-Coupling Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in pipe coupling machines and consists in means for making such couplings by forming interengaging beads upon the ends of the pipes to be joined, thus making a fluid-tight joint without rivets.

One object of the invention is to provide a machine which shall be adapted to different lengths and diameters of pipe sections.

Another object of the invention is to provide means for rotating the pipes during the joining operation.

Still another object of the invention is to provide means for readily and quickly throwing into and out of operation the pipe turning means.

Other objects will appear hereinafter as I proceed with the description of that embodiment of the invention, which, for the purpose of the present application is illustrated in the accompanying drawings, in which:

Figure 1 is a view in side elevation of the entire apparatus, certain other parts being shown in section. Fig. 2 is a detail view partly in section of a portion of the apparatus shown in Fig. 1, the parts being upon a larger scale. Fig. 3 is a fragmental detail partly in cross section, showing the bead forming elements of my invention. Fig. 4 is a cross section upon the line 4—4 Fig. 1, looking in the direction of the arrows. Fig. 5 is a cross section taken upon the line 5—5, Fig. 1, and looking in the direction of the arrows.

Same reference characters refer to like parts throughout the views.

In the drawings, the numeral 5 indicates a base of any suitable material, such, for instance, as concrete or cast iron. Into the base 5 are set bolts 6 by means of which is anchored to the base a standard 7, having a perforation therein adapted to receive a horizontally projecting arm 8 shown in the drawing as circular in cross section, the arm 8 being held in place by means of a nut 9 threaded upon a part 10 of small diameter which is integral with the arm 8.

In the forward extremity of the arm 8 is threaded a short rod 11, smooth at 12 to form an axle for a rotatable disk 13 provided around its periphery with a bead 14. The loosely mounted disk 13 is held in place upon the shaft 12 by a nut 15 threaded upon the small free extremity of the rod 11. A second arm 16 is mounted upon the standard 7 and projects therefrom in a direction parallel to the direction of the arm 8 and directly above the same. The bracket 17 of a fluid operating hammer 18 is secured upon the arm 16 in such a position as to bring the operating face of the hammer directly above the bead 14, the hammer having a groove 19 cut therein to coöperate with the bead 14 for pipe joining purposes in a manner which will be readily understood. The hammer 18 is controlled by a suitable valve or stopcock 20 and the energizing fluid is fed to the hammer from any suitable source through a flexible conduit 21.

A collar 22, the opening of which is eccentrically arranged (as clearly illustrated in Fig. 5) is mounted to slide upon the arm 8, a set screw 23 being provided for the purpose of fastening the collar in any desired adjustment, the set screw preventing both longitudinal and rotational movements. The collar 22 has formed thereon an annular shoulder 24 against which one end of a pipe section 25 may bear. Anti-friction rollers 26 are mounted within the collar 22 to facilitate the rotation of the pipe during the coupling operation. The other section 27 of the pipe to be coupled is supported by one or more rings 28 of sufficiently large diameter to accommodate the largest sizes of pipes. This ring 28 is formed of material U-shaped in cross section and has anti-friction rollers 29 mounted therein. It is supported at the top by a short rod 30 and a turn buckle depending from the axle of a groove wheel 32 which rides upon an overhead track 33 arranged parallel with the arms 8 and 16.

The means illustrated for rotating the pipe section comprises a belt 34 the ends of which are very readily attached and detached being connected by a hinge 35 the pintle 36 of which is removable. The belt 34 runs upon the pulley 37, keyed to a shaft 38 which has upon one extremity a loose pulley 39 and a fixed pulley 40 over either of which a power transmitting belt 41 may be caused to run by means of a belt shifting lever (not illustrated). Standards 42 and 43 support the shaft journals 44 and 45 which are of a peculiar construction. The journal 44 consists of a sleeve, the outer surface of which is curved as shown at 46, the corresponding inner surface of the standard 42 being similarly curved so as to form a ball and socket connection permitting tilting of the shaft 38. The journal 45 consists of a cylindrical block having a shaft bearing 47 eccentrically placed, the journal 45 being provided with a handle 48 for rocking the journal in the standard 43.

From the foregoing description the operation of my improved pipe coupling machine will be readily understood. A collar 22 of the proper diameter is selected and placed upon the arm 8 at a distance from its forward extremity equal to the length of one of the pipe sections to be joined, the disk 13 being then mounted in place upon the axle 12. The pipe sections 25 and 27 are then put in place as illustrated in Fig. 1 of the drawings, the section 27 being supported in one or more rings 28. A belt 34 of the proper length is then selected and after being passed around the pipe section 27 and the pulley 37 has its ends fastened by the insertion of the pintle 36 through the parts of the hinge 35, it being understood that during this belt adjustment operation the handle 48 is in the position illustrated in Figs. 1 and 2, the pulley 37 being thereby in its highest position. The hammer 18 is now started by opening the stopcock 20 and the belt 34 is rendered taut by throwing down the handle 48. The bead connection between the pipe sections are then rapidly formed as will be apparent to anyone skilled in the art. When the joint is completed the sections 25 and 27 are shifted to the right being supported in the movement by rings 28 and a new pipe section is placed over the arm 8 and joined to the preceding sections in the manner just described.

It will be apparent that a set of collars 22 of various sizes and that a set of belts 34 of various lengths may be kept on hand and that by selecting the proper collar 22 and belt 34 and positioning the collar 22 in the proper place upon the arm 8 the machine will be adaptable to joining pipe sections of any length or diameter.

I claim as my invention:

1. In a pipe coupling machine, a support including an arm extending into the pipe for the length of a section approximately, a disk loosely rotatable on the end of said support, a mechanically driven rapidly reciprocating hammer coöperating with said disk, one of the coöperating elements having a bead and the other a counterpart groove arranged to form interengaging beads upon the sections of the pipe to be joined.

2. In a machine, a standard, an arm fixed in and projecting horizontally from said standard, a disk of diameter at least equal to that of the arm and carrying a bead, said disk being removably and rotatably supported upon the free extremity of the arm, means coöperating with said bead for embossing a pipe section when placed over said bead, and a circular disk having eccentrically therethrough an opening adapted to fit said arm whereby the second named disk is slidable thereon and removable therefrom when the first disk is removed.

3. In a pipe coupling machine, a support including an arm extending into the pipe for the length of one section approximately, a disk loosely rotatable upon the end of said support, a bead at the periphery of said disk, a mechanically driven rapidly reciprocating hammer having a groove therein corresponding in shape to said bead and arranged to co-act therewith to form interengaging beads upon the section of pipe to be joined.

In testimony whereof I affix my signature in presence of two witnesses.

ERNEST HUMPHREY.

Witnesses:
A. J. O'BRIEN,
A. L. LEHMAN.